United States Patent
Pendharkar et al.

(10) Patent No.: US 9,160,610 B1
(45) Date of Patent: Oct. 13, 2015

(54) METHOD AND APPARATUS FOR COORDINATING SERVICE EXECUTION WITHIN A SHARED FILE SYSTEM ENVIRONMENT TO OPTIMIZE CLUSTER PERFORMANCE

(75) Inventors: Niranjan S. Pendharkar, Pune (IN); Samir Desai, Pune (IN)

(73) Assignee: Symantec Corporation, Mountain View, CA (US)

( * ) Notice: Subject to any disclaimer, the term of this patent is extended or adjusted under 35 U.S.C. 154(b) by 989 days.

(21) Appl. No.: 12/415,472

(22) Filed: Mar. 31, 2009

(51) Int. Cl.
*G06F 15/16* (2006.01)
*G06F 15/167* (2006.01)
*G06F 17/00* (2006.01)
*G06F 17/30* (2006.01)
*G06F 12/00* (2006.01)
*G06F 7/00* (2006.01)
*H04L 29/12* (2006.01)
*H04L 12/24* (2006.01)

(52) U.S. Cl.
CPC .... *H04L 29/12132* (2013.01); *G06F 17/30067* (2013.01); *G06F 17/30286* (2013.01); *H04L 41/5096* (2013.01); *H04L 61/1552* (2013.01)

(58) Field of Classification Search
CPC ................... H04L 29/12132; H04L 61/1552; H04L 41/5096; G06F 17/30067; G06F 17/30286
USPC ............................ 709/217; 707/608, 705, 828
See application file for complete search history.

(56) References Cited

U.S. PATENT DOCUMENTS

| | | | |
|---|---|---|---|
| 6,182,136 B1 * | 1/2001 | Ramanathan et al. | 709/224 |
| 6,226,788 B1 * | 5/2001 | Schoening et al. | 717/107 |
| 6,330,602 B1 * | 12/2001 | Law et al. | 709/224 |
| 6,360,253 B1 * | 3/2002 | Freeny | 709/217 |
| 6,813,632 B2 * | 11/2004 | Waltermann | 709/214 |
| 6,963,421 B1 * | 11/2005 | Amarger | 358/1.18 |
| 7,188,155 B2 * | 3/2007 | Flurry et al. | 709/219 |
| 7,412,529 B2 * | 8/2008 | Ryu | 709/230 |
| 2004/0105431 A1 * | 6/2004 | Monjas-Llorente et al. | 370/352 |
| 2006/0031536 A1 * | 2/2006 | Eydelman et al. | 709/228 |
| 2006/0209900 A1 * | 9/2006 | Sekaran et al. | 370/503 |
| 2007/0276921 A1 * | 11/2007 | Riggs et al. | 709/217 |
| 2009/0106431 A1 * | 4/2009 | Garfinkle et al. | 709/228 |
| 2009/0144422 A1 * | 6/2009 | Chatley et al. | 709/226 |
| 2010/0023625 A1 * | 1/2010 | Lee et al. | 709/227 |

\* cited by examiner

*Primary Examiner* — Azizul Choudhury
(74) *Attorney, Agent, or Firm* — Campbell Stephenson LLP

(57) ABSTRACT

A method and apparatus for coordinating service execution within a shared storage cluster file system environment to optimize cluster performance is disclosed. In one embodiment, the method includes accessing host information in memory comprising mappings between file data and a plurality of nodes, wherein the mappings indicate at least one portion of the file data that is accessed by at least one node of the plurality of nodes on behalf of at least one application and executing at least one service on the at least one node of the plurality of nodes using at least one processor, wherein the at least one service accesses the at least one portion of the file data in the memory.

23 Claims, 3 Drawing Sheets

METHOD AND APPARATUS FOR COORDINATING SERVICE EXECUTION WITHIN A SHARED FILE SYSTEM ENVIRONMENT TO OPTIMIZE CLUSTER PERFORMANCE

BACKGROUND

1. Field of the Invention

Embodiments of the present invention generally relate to cluster management and, more particularly, to a method and apparatus for coordinating service execution within a shared file system environment to optimize cluster performance.

2. Description of the Related Art

In a typical computing environment, enterprises utilize one or more resources (i.e., hardware and/or software) to execute various operations (e.g., business transactions, administration, resource management, manufacturing, and/or the like that generate a significant amount of data, which is stored on one or more storage systems (e.g., hard drives, disk drives, disk arrays, Network Attached Storage (NAS) appliances, Storage Area Network (SAN) devices, and the like).

To achieve flexible and optimum utilization of the one or more storage systems, one or more clusters (e.g., computer clusters) are configured to share the storage device amongst one or more nodes (i.e., physical machines, virtual machines and/or the like). Software within the nodes may be configured to mount a particular file system (e.g., a Cluster File System (CFS)) on the shared storage device and access data within a shared file system environment. As a result, one or more applications concurrently share file data through the nodes of the cluster that hosts the particular file system (i.e., the CFS).

It is highly desirable to run various services (e.g., data backup, replication, archiving, data leakage prevention, and/or the like) in order to manage and/or protect file data (e.g., spreadsheets, documents, and the like) that is stored in the shared storage. An administrator may desire to run these services to protect the file data embedded in a NAS appliance. Subsequently, the various services access (i.e., scan and/or read) the file data from the shared storage. For example, during backup operation, the service may read a file from the shared NAS appliance and send a backup image of the file to a backup server.

Within the shared file system environment, the NAS appliance provides non-shared access and shared access to particular file data. In non-shared access, an application running on a node does not share the particular file data with another application running on different node. In shared access, a service may require access to the particular file data via a node that is different from the node through which the application accesses the particular file data. For example, a virus scan service running on a particular node may look for a virus signature within a file (e.g., document file) that is accessed by an application (e.g., MICROSOFT Word) running on other node. As a result, the particular file data needs to be shared amongst the applications and services running on different nodes of the cluster.

In order to achieve shared access, the file data must maintain point-in-time consistency within the shared file system environment. As a result, overhead information (e.g., appropriate locking, ownership, and the like) is communicated between two or more nodes accessing a same set of files, which consumes various computer resources (e.g., a network bandwidth capacity, a processor capacity and/or the like). Sharing the same file data with a service (e.g., a file scanning service) running on a node causes a longer access time for the application that is running on a different node. If a particular service running on the particular node is accessing the particular file data, then the application running on the different node cannot access the particular file data because access is locked by the particular service. Consequently, sharing access to the file data amongst the services and the user applications degrades a performance and a stability of the cluster within the shared cluster file system environment.

Therefore, there is a need in the art for a method and apparatus for coordinating service execution within a shared file system environment to optimize cluster performance.

SUMMARY OF THE INVENTION

Embodiments of the present invention comprise a method and apparatus for coordinating service execution within a shared storage cluster file system environment to optimize cluster performance. In one embodiment, a method for coordinating service execution within a shared storage cluster file system environment to optimize cluster performance includes accessing host information in memory comprising mappings between file data and a plurality of nodes, wherein the mappings indicate at least one portion of the file data that is accessed by at least one node of the plurality of nodes on behalf of at least one application and executing at least one service on the at least one node of the plurality of nodes using at least one processor, wherein the at least one service accesses the at least one portion of the file data in the memory.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
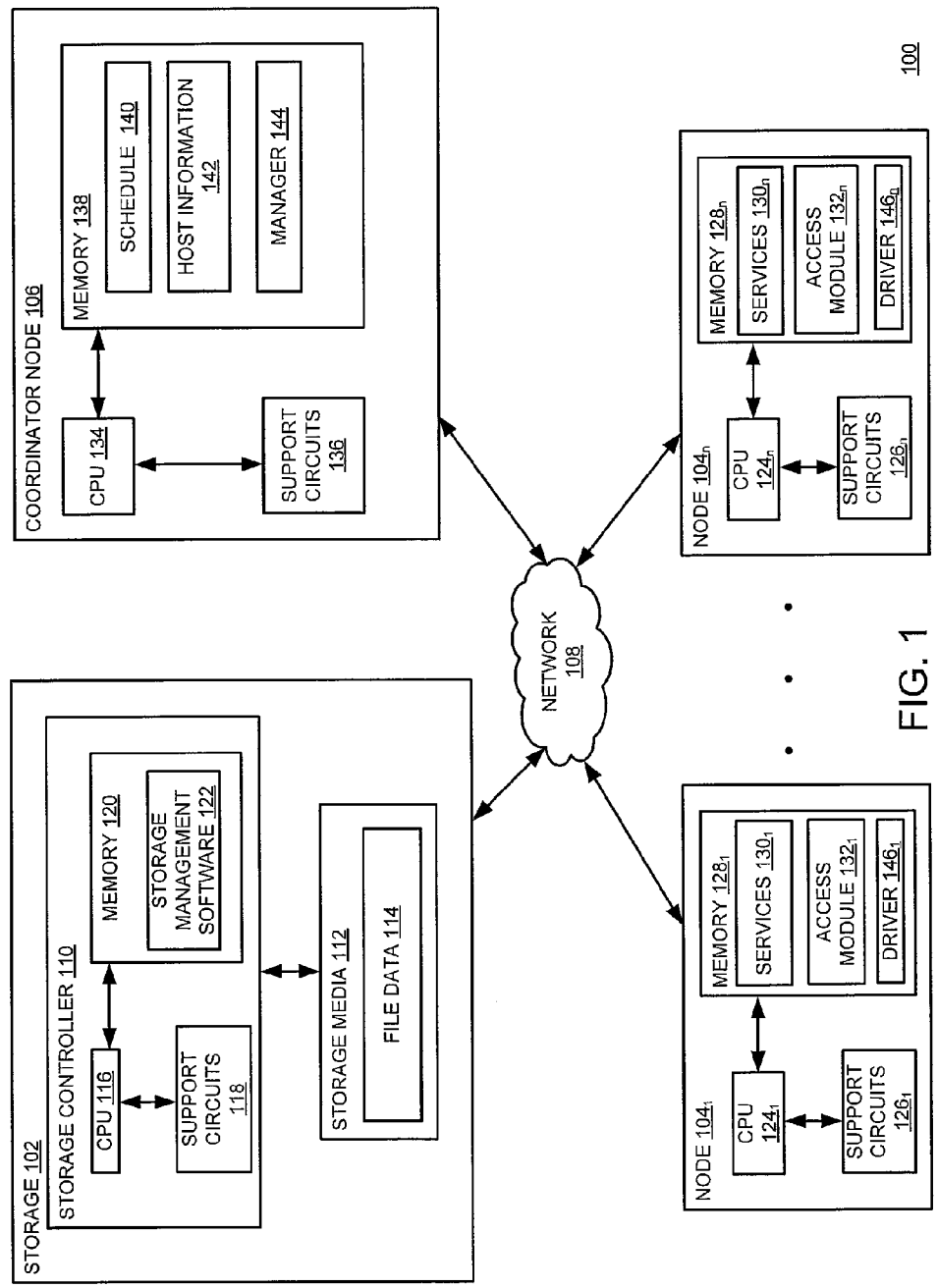
FIG. 1 is a block diagram of a system for coordinating service execution within a shared file system environment to optimize cluster performance according to one or more embodiments of the invention.

FIG. 1 is a block diagram of a system 100 for coordinating service execution within a shared storage cluster file system environment to optimize cluster performance according to one or more embodiments of the invention. The system 100 comprises a storage 102, a plurality of nodes 104 (illustrated as a node $104_1$ and a node $104_N$), and a coordinator node 106, where each is coupled to one another through a network 108. In accordance with various embodiments of the invention, the system 100 reduces or eliminates system performance and/or stability degradation caused by sharing access to one or more storage devices. For example, if a backup service and a user application access a same file through a same node, then in-memory consistency of the same file does not need to be maintained across the plurality of nodes 104, which reduces overhead caused by sharing file access. A reduction of overhead and/or the elimination of the system performance and/or stability degradation optimizes cluster performance of the plurality of nodes 104.

The storage 102 generally includes various components (i.e., hardware and software) that are configured to manage storage resources. The storage 102 generally includes a storage controller 110 and storage media 112. The storage media 112 may include one or more data storage devices (e.g., hard disk drives, optical drives, magnetic tape drives and/or the like). The storage 104 facilitates access to critical computer data, such as file data 114, that is stored in the storage media 112 (e.g., a sequential backup media (i.e., magnetic tape), an optical storage media (e.g., hard disk) and/or the like). The storage controller 110 may include a CPU 116, various support circuits 118 and memory 120. The memory 120 further includes storage management software 122 that provides an interface (e.g., Integrated Drive Electronics/AT Attachment (IDE/ATA), Small Computer Systems Interface (SCSI) and/or the like) to the one or more data storage devices for one or more computing devices, such as the coordinator node 106 and/or the plurality of nodes 104.

Each node of the plurality of nodes 104 may be a type of a physical or virtual computing device (e.g., a laptop, a server machine, a virtual machine, a desktop and/or the like) and includes a Central Processing Unit (CPU) 124, various support circuits 126 and a memory 128. The CPU 124 may comprise one or more commercially available microprocessors or microcontrollers that facilitate data processing and storage. The various support circuits 126 facilitate the operation of the CPU 124 and include one or more clock circuits, power supplies, cache, input/output circuits, and the like. The memory 128 comprises at least one of Read Only Memory (ROM), Random Access Memory (RAM), disk drive storage, optical storage, removable storage and/or the like. The memory 128 further includes various software packages, such as a plurality of services 130, a plurality of access modules 132 and a plurality of drivers 146.

Generally, the plurality of nodes 104 are designed to host a shared storage cluster file system environment for one or more client computers (not shown in the figures). The plurality of nodes 104 may include servers that form at least a portion of a cluster (e.g., a VERITAS Cluster One (VCSOne) cluster). The cluster may provide file storage and application services to a plurality of clients, such as a file server, a web server, an application server and/or the like. The plurality of nodes 104 cooperate to provide access to shared storage devices within the storage 102 for a plurality of user applications currently operating on the plurality of clients. For example, a particular user application accesses user data files through one or more nodes of the plurality of nodes 104. The plurality of applications may be cluster aware and/or cluster ready applications. In one embodiment, the plurality of applications (e.g., a MICROSOFT OFFICE application, engineering design automation (i.e., EDA, AUTOCAD) and/or the like) may process and store one or more user files within the shared storage devices (i.e., the storage 102).

The coordinator node 106 is a type of computing device that operates independent of the plurality of nodes 104 (e.g., out of band). The coordinator node 106 includes a Central Processing Unit (CPU) 134, various support circuits 136 and a memory 138. The CPU 134 may comprise one or more commercially available microprocessors or microcontrollers that facilitate data processing and storage. The various support circuits 136 facilitate the operation of the CPU 134 and include one or more clock circuits, power supplies, cache, input/output circuits, and the like. The memory 138 comprises at least one of Read Only Memory (ROM), Random Access Memory (RAM), disk drive storage, optical storage, removable storage and/or the like. The memory 138 includes various data, such as a schedule 140 and host information 142. The memory 138 further includes various software packages, such as a manager 144. The coordinator node 106 is configured to schedule the plurality of services 130 (e.g., backups of the file data 114) and collect the host information 142 from the plurality of nodes 102 (e.g., file change log files). In another embodiment of the invention, the coordinator node 106 may be replaced by one or more software modules, such as the manager 144, running on the plurality of nodes 104.

The plurality of nodes 104 may be file servers in a shared cluster file system that is built on Network Attached Storage (NAS) architecture. As such, the plurality of nodes 104 may form a NAS appliance that communicates with the storage 102. Such a NAS appliance provides the plurality of applications with access to the file data 114 within the storage 102. As an example, the plurality of nodes may form at least a portion of a soft cluster file server appliance (e.g., SYMANTEC Storage Foundation Scalable File Server, SYMANTEC Storage Foundation Cluster File System, and the like). The plurality of user applications running on the plurality of clients communicate with the plurality of nodes 104 using one or more protocols (e.g., a Network File System (NFS), Common Internet File System (CIFS) and the like).

The network 108 comprises a communication system that connects computers by wire, cable, fiber optic and/or wireless link facilitated by various types of well-known network elements, such as hubs, switches, routers, and the like. The network 108 may employ various well-known protocols to communicate information amongst the network resources. For example, the network 108 may be a part of the Internet or Intranet using various communications infrastructure such as Ethernet, WiFi, WiMax, General Packet Radio Service (GPRS), and the like. Furthermore, the network 108 may form a portion of a Storage Network Area (SAN) using various communications infrastructure such as Ethernet, Fibre Channel, InfiniBand, iSCSI and the like.

The plurality of nodes 104 facilitate shared access to one or more storage disks and/or volumes within the shared storage cluster file system environment. The plurality of user applications running on the plurality of clients share access to various portions of the file data 114 through the plurality of nodes 104. The plurality of client computers may communicate various operations (e.g., file system operations) to be performed on the file data 114 by the plurality of nodes 104 on behalf of the plurality of user applications. In one or more embodiments, each node of the plurality of nodes 104 includes an access module of the plurality of access modules 132 to process one or more operations from the plurality of clients and apply the one or more operations to a portion of the file data 114 (e.g., one or more files associated with a specific user). The plurality of access modules 132 may be a NAS file access service that is configured to add, modify and/or delete user data from the storage 102.

Generally, the file data 114 includes one or more files that are utilized by the plurality of applications. For example, a file stored within the file data 114 may be an application data file, an installation file, an executable file, a configuration file, a library file and/or the like. As another example, the file may also be a text file, a multimedia file, a video file, an audio file, an image file and/or the like. For example, the plurality user applications may share access to one or more files within in a shared CFS environment.

The plurality of nodes 104 are designed to execute various services (e.g., data replication, data leakage prevention, data archiving, data backup, virus protection/security scanning and/or the like) that process one or more portions of the file data 114, such as a plurality of services 130. Generally, a particular service of the plurality of services 130 may perform various operations on the one or more portions of the file data 114 (e.g., read, scan, modify, quarantine and the like). For example, the plurality of services 130 may include one or more services that scan and/or read files within a volume in order to detect malware and/or remediate sensitive information. The schedule 140 indicates an order of execution of the plurality of services 130. For example, the schedule 140 indicates a particular node by cluster node ID for executing a virus scan service.

According to one or more embodiments, the plurality of drivers 146 (i.e., a file system filter driver, such as a CFS driver or a File Change Log (FCL) driver) includes software code that is executed by the CPU 124 to process a file system hierarchy of various objects, such as the file data 114. The plurality of drivers 146 may be configured to mount and/or operate a particular file system (e.g., a VERITAS Cluster File System (CFS), SUN Lustre File System (LFS) and the like) associated with the shared storage devices. In one embodiment, the CPU 124 executes a driver of the plurality of drivers 146 stored in the memory 128 to identify one or more files (e.g., within the file data 114) accessed by a particular node of the plurality of nodes 104 on behalf of a user application.

The plurality of drivers 146 cooperates with the plurality of access modules 132 to apply system operations to the file data 114 on behalf of the plurality of user applications. As such, the plurality of drivers 146 processes one or more file system operations from a particular node of the plurality of nodes 104. After the one or more file system operations are performed, the plurality of drivers 146 generates one or more mappings between the particular node of the plurality of nodes 104 and various portions of the file data 114 that are affected by the one or more file system operations. For example, the plurality of drivers 146 generates a mapping that includes a cluster node ID associated with the particular node and a file ID associated with an added file, a modified file or a deleted file. Alternatively, the plurality of drivers 146 cooperates with the plurality of access modules 130 to process one or more file change logs on the plurality of nodes 104 and generate the one or more mappings. The plurality of drivers 146 stores such mappings in the memory 138 as the host information 142.

According to various embodiments, the CPU 116 executes the manager 144 stored in the memory 138 to coordinate execution of the services 130 amongst the plurality of nodes 104. In one embodiment, the manager 144 examines the host information 142 to process mappings between the file data 114 and the plurality of nodes 104. The manager 144 identifies a portion of the file data 114 (e.g., one or more files) that is accessed on behalf of a user application by a particular node of the plurality of nodes 104. The plurality of services 130 may include a service that is scheduled to run on the same portion of the file data 114. Accordingly, the manager 144 executes the scheduled service on the particular node. Because the particular node is accessing the same portion of the file data exclusively, the coordinator node 106 does not need to maintain a point-in-time consistency for the file data 114.

In one embodiment, the host information 142 includes one or more File Change Log (FCL) files that are generated by the plurality of access modules 132 and communicated to the plurality of drivers 146. A FCL file may indicate various changes to one or more files within the shared file system. The FCL file may includes data related to sequence of file system operations that are performed on the file data 114 on behalf of the plurality of user applications. For example, the FCL file indicates data (e.g., a cluster node ID) associated with a particular node through which a user application is accessing one or more files.

The manager 144 invokes one or more system function calls (e.g., open ( ) Iseek ( ), read ( ) and close ( )) to access and examine the FCL file. For example, the manager 144 identifies a cluster node ID associated with file access by a user application. Accordingly, a particular node having the cluster node ID of the plurality of nodes 102 processes one or more file system operations on behalf of the user application. The manager 144 examines the schedule 140 to identify one or more services of the plurality of services 130 that are to be performed on one or more same files as the user application. In one or more embodiments, the manager 144 adjusts the schedule 140 to execute the one or more services of the plurality of services 130 on the particular node.

Figure 2:
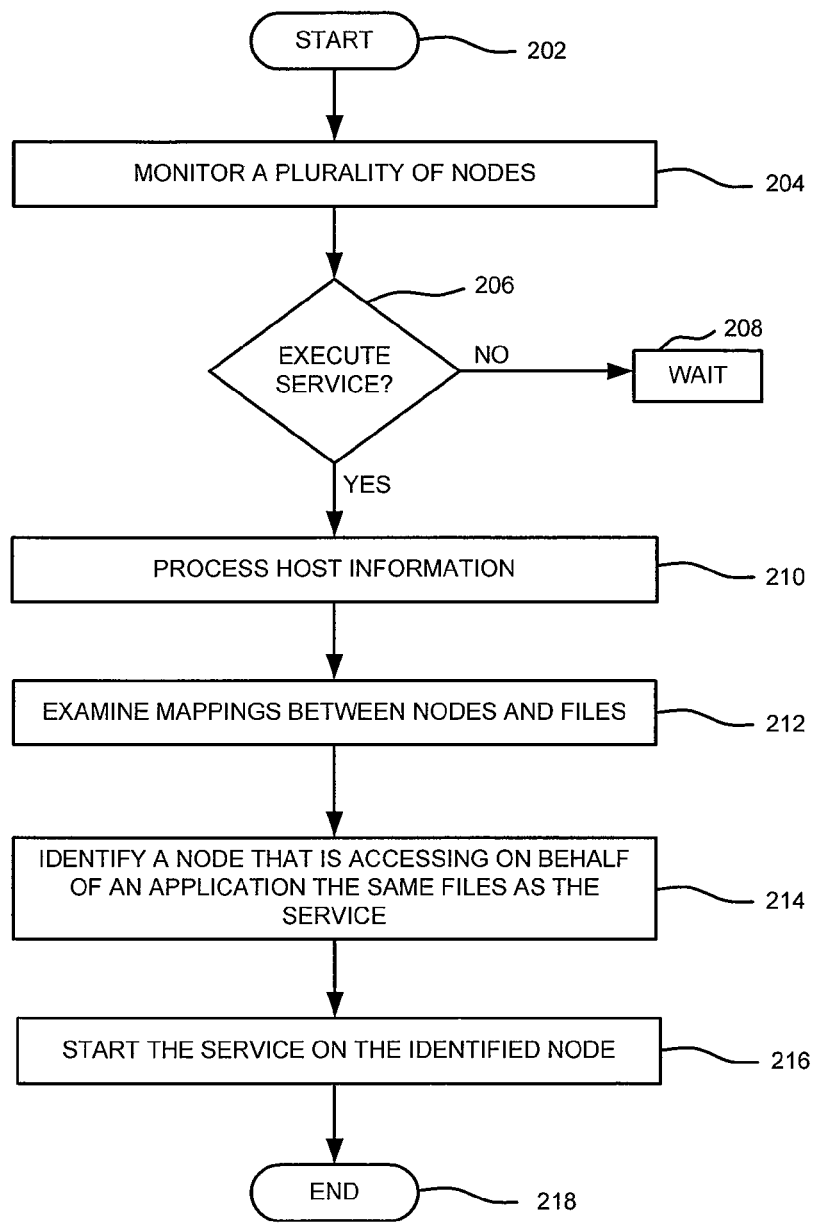
FIG. 2 is a flow diagram of a method for coordinating service execution within a shared file system environment to optimize cluster performance according to one or more embodiments of the invention.

FIG. 2 is a flow diagram of a method 200 for coordinating service execution within a shared file system environment to optimize cluster performance according to one or more embodiments of the invention. The method 200 starts at step 202 and proceeds to step 204, at which a plurality of nodes (e.g., the plurality of nodes 104 of the FIG. 1) are monitored. In one embodiment, a manager (e.g., the manager 144 of the FIG. 1) monitors one or more files that are accessed by a plurality of applications (e.g., the plurality of applications 112 of the FIG. 1) running on the plurality of nodes.

At step 206, a determination is made as to whether a service (e.g., the services 114 of the FIG. 1) is to be executed (e.g., at the node $104_1$ of the FIG. 1). If at step 206, it is determined that the service is not to be executed (option "NO"), then the method 200 proceeds to step 208. At the step 208, the method 200 waits for a definable time-period until the service is ready to be executed. If at step 206, it is determined that that service is to be executed (option "YES"), then the method 200 proceeds to step 210. At the step 210, host information (e.g., the host information 142 of the FIG. 1) is processed. At step 212, mappings between the nodes and files are examined. At step 214, a node that accesses on behalf of an application the same files as requested by the service is identified. At step 216, the service is started on the identified node. At step 218, the method 200 ends.

Figure 3:
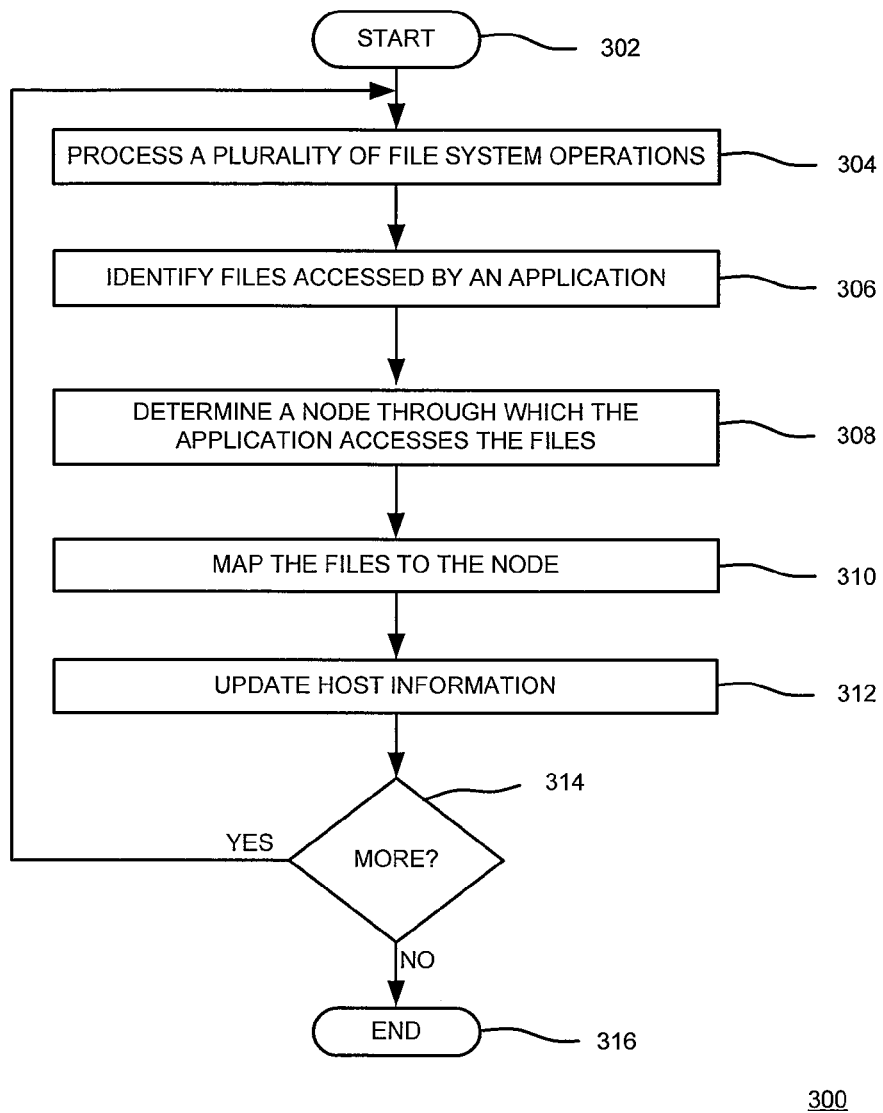
FIG. 3 is a flow diagram of a method for updating host information according to one or more embodiments of the invention.

FIG. 3 is a flow diagram of a method 300 for updating host information according to one or more embodiments of the invention. The method 300 starts at step 302 and proceeds to step 304, at which a plurality of file system operations are processed. In one embodiment, a driver (e.g., the plurality of drivers 146 of the FIG. 1) invokes various operating system function calls to generate a File Change Log (FCL).

At step 306, one or more files that are accessed by an application (e.g., the plurality of applications 112 of the FIG. 1) are identified. In one embodiment, the driver utilizes the plurality of file system operations to identify the one or more files. In one embodiment, the driver processes the FCL file to identify the one or more files that are accessed by the application. At step 308, a node through which the application accesses the one or more files is determined. In one embodiment, the driver identifies at least one node of the plurality of nodes that performs one or more file system operations on behalf of the application. At step 310, the files are mapped to the node. In one embodiment, the driver uses various identification (ID) data, such as a process ID, a service group ID, a node ID and/or the like, for mapping the files to the node. At step 312, the host information (e.g., the host information 144 of the FIG. 1) is updated.

At step 314, a determination is made as to whether more file system operations are processed. If at step 314, it is determined that more file system operations are processed (option "YES"), then the method 300 proceeds to the step 304. If at step 314, it is determined that more file system operations are not processed (option "NO"), then the method 300 proceeds to step 316. At the step 316, the method 300 ends.

While the foregoing is directed to embodiments of the present invention, other and further embodiments of the invention may be devised without departing from the basic scope thereof, and the scope thereof is determined by the claims that follow.

The invention claimed is:

1. A method comprising: identifying file data requested by a service; determining, in response to the file data being requested by the service, which node of a plurality of nodes is providing an application with access to the file data, wherein the determining comprises accessing memory, the memory comprises a mapping generated by a plurality of file drivers between one or more files within the file data and a node of a plurality of nodes, the plurality of nodes is configured to provide shared access to the file data, the mapping identifies the one or more files within the file data that are accessed via the node of the plurality of nodes on behalf of the application, the file data is stored by a shared storage device, and the shared storage device is configured to be accessed by the plurality of nodes; selecting the node from the plurality of nodes on which the service is to be executed, wherein at least two of the plurality of nodes are configured to execute the service, the service is configured to access the one or more files within the file data using the node, and the selecting is based both on the mapping identifying that the one or more files within the file data is are being accessed by via the node on behalf of the application, and the service being configured to access the one or more files within the file data using the node; and executing the service on the node using at least one processor, wherein the service accesses the one or more files within the file data in the shared storage device.

2. The method of claim 1, wherein the executing comprises adjusting a schedule to execute the service on the node, the schedule comprises a plurality of services to be executed on the plurality of nodes, and the adjusting the schedule comprises re-ordering the schedule such that the service is executed on the node while the mapping generated by the plurality of file drivers indicates that the one or more files within the file data is are being accessed by the node on behalf of the application.

3. The method of claim 1, wherein
the application is executed on a client,
the client is coupled to the node, and
the application is configured to access the one or more files within the file data through the node using one or more file system operations.

4. The method of claim 1, wherein the plurality of file drivers that generate the mapping by detect which one node out of the plurality of nodes has exclusive access to the one or more files within the file data.

5. The method of claim 3, wherein
the accessing further comprises processing a file change log to identify the node, and
the file change log indicates which application performs the one or more file system operations.

6. The method of claim 1, wherein the accessing further comprises processing a plurality of file system operations using the plurality of file drivers to generate a plurality of mappings, the shared storage device comprises a plurality of files including the one or more files within the file data, each of the mappings identifies which node out of the plurality of nodes accesses each of the plurality of files, and the plurality of mappings comprise the mapping.

7. The method of claim 1, wherein
the accessing is performed in response to the service being scheduled for execution on the node.

8. A non-transitory computer-readable storage medium storing program instructions executable to: identify file data requested by a service; determine, in response to the file data being requested by the service, which node of a plurality of nodes is providing an application with access to the file data, wherein determining which node comprises accessing memory storing a mapping generated by a plurality of file drivers between one or more files within the file data and a node of a plurality of nodes using at least one processor, the plurality of nodes is configured to provide shared access to the file data, the mapping identifies the one or more files within the file data via the node of the plurality of nodes on behalf of the application, the file data is stored by a shared storage device, and the shared storage device is operable to be accessed by the plurality of nodes; select the node from the plurality of nodes on which the service is to be executed, wherein the service is configured to access the file data using the node, and the node is selected based both on the mapping identifying that the one or more files within the file data is are being accessed by via the node on behalf of the application, and the service being configured to access the one or more files within the file data using the node; and execute the service on the node using at east one processor, wherein the service, when executed, accesses the one or more files within the file data in the shared storage device.

9. The non-transitory computer-readable storage medium of claim 8, further comprising program instructions executable to:
adjust a schedule to execute the service on the node of the plurality of nodes, wherein
the schedule comprises a plurality of services to be executed on the plurality of nodes, and
the adjustment of the schedule comprises re-ordering the schedule such that the service is executed on the node while the mapping indicates that the one or more files within the file data are being accessed by the node on behalf of the application.

10. The non-transitory computer-readable storage medium of claim 9, wherein
the application is executed on a client,
the client is coupled to the node, and
the application is configured to access the one or more files within the file data through the node using one or more file system operations.

11. The non-transitory computer-readable storage medium of claim 8, wherein the plurality of file drivers that generate the mapping by detect which one node out of the plurality of nodes has exclusive access to the one or more files within the file data.

12. The non-transitory computer-readable storage medium of claim 8, further comprising program instructions executable to:
process a file change log to identify the node, wherein
the file change log indicates which application performs the one or more file system operations on the one or more files within the file data.

13. The non-transitory computer-readable storage medium of claim 8 further comprising program instructions executable to:

process a plurality of file system operations to generate a plurality of mappings using the plurality of drivers, wherein the shared storage device comprises a plurality of files including the one or more files within the file data, each of the mappings identifies which node out of the plurality of nodes accesses each of the plurality of files, and the plurality of mappings comprise the mapping.

14. The non-transitory computer-readable storage medium of claim 9, wherein the memory is accessed in response to scheduling the service to be executed.

15. A system comprising: a plurality of nodes; and a memory coupled to the plurality of nodes, wherein the memory stores program instructions executable to: identify file data requested by a service, determine, in response to the file data being requested by the service, which node of a plurality of nodes is providing an application with access to the file data, wherein determining which node comprises accessing a mapping generated by a plurality of file drivers between one or more files within the file data and a node of the plurality of nodes, the plurality of nodes is configured to provide shared access to the file data, the mapping identifies the one or more files within the file data via the node on behalf of the application, the file data is stored by a shared storage device, and the shared storage device is operable to be accessed by the plurality of nodes, select the node from the plurality of nodes on which the service is to be executed, wherein at least two of the plurality of nodes are capable of executing the service, the service is configured to access the file data using the node, and the node is selected based both on the mapping identifying that the one or more files within the file data is are being accessed by via the node on behalf of the application, and the service being configured to access the file data using the node, and execute the service on the node using at least one processor, wherein the service, when executed, accesses the one or more files within the file data in the shared storage device.

16. The system of claim 15, further comprising program instructions executable to:

adjust a schedule to execute the service on the node of the plurality of nodes, wherein the schedule comprises a plurality of services to be executed on the plurality of nodes, and the adjustment of the schedule comprises re-ordering the schedule such that the service is executed on the node while the mapping indicates that the one or more files within the file data are being accessed by the node on behalf of the application.

17. The system of claim 16, wherein the application is executed on a client, the client is coupled to the node, and the application is configured to access the one or more files within the file data through the node using one or more file system operations.

18. The system of claim 15 wherein the plurality of file drivers that generate the mapping by detect which one node out of the plurality of nodes has exclusive access to the one or more files within the file data.

19. The system of claim 15, further comprising program instructions executable to:

process a file change log to identify the node, wherein the file change log indicates which application performs the one or more file system operations on the one or more files within the file data.

20. The system of claim 15 further comprising program instructions executable to: process a plurality of file system operations, and generate a plurality of mappings using the plurality of file drivers, wherein the shared storage device comprises a plurality of files including the one or more files within the file data, each of the mappings identifies which node out of the plurality of nodes accesses each of the plurality of files, and the plurality of mappings comprise the mapping.

21. The method of claim 5, wherein a file driver of the plurality of the drivers utilizes the one or more file system operations to identify the one or more files within the file data, and identifies at least one node of the plurality of nodes that performs the one or more file system operations on behalf of the application.

22. The method of claim 21, wherein the driver of the plurality of the drivers invokes one or more operating system function calls to generate the file change log.

23. The method of claim 2, wherein the plurality of services are scheduled by a coordinator node, and the coordinator node operates independently of the plurality of nodes.

\* \* \* \* \*